United States Patent [19]
Kenneth et al.

[11] Patent Number: 5,949,046
[45] Date of Patent: *Sep. 7, 1999

[54] APPARATUS FOR ISSUING INTEGRATED CIRCUIT CARDS

[75] Inventors: Alexander R. Kenneth; Mark J. Stewart, both of Dundee, United Kingdom

[73] Assignee: NCR Corporation, Dayton, Ohio

[*] Notice: This patent issued on a continued prosecution application filed under 37 CFR 1.53(d), and is subject to the twenty year patent term provisions of 35 U.S.C. 154(a)(2).

[21] Appl. No.: 08/681,449

[22] Filed: Jul. 23, 1996

[30] Foreign Application Priority Data

Dec. 14, 1995 [GB] United Kingdom .................. 9525522

[51] Int. Cl.⁶ ............................................... G06K 5/00
[52] U.S. Cl. ........................... 235/380; 235/381; 235/492; 235/493
[58] Field of Search .................................... 235/380, 381, 235/439, 440, 448, 487, 492, 493, 451; 902/26, 27, 29

[56] References Cited

U.S. PATENT DOCUMENTS

| | | | |
|---|---|---|---|
| 4,193,099 | 3/1980 | Hayashi | 360/17 |
| 4,288,825 | 9/1981 | Hasuo et al. | 235/449 X |
| 4,518,853 | 5/1985 | Gabel et al. | 235/449 |
| 4,684,791 | 8/1987 | Bito | 235/380 |
| 4,701,600 | 10/1987 | Beech et al. | 235/375 |
| 4,825,054 | 4/1989 | Rust et al. | 235/380 |
| 4,851,651 | 7/1989 | Gaucher | 235/380 |
| 4,900,906 | 2/1990 | Pusic | 235/381 |
| 5,010,239 | 4/1991 | Mita | 235/441 |

FOREIGN PATENT DOCUMENTS

| | | |
|---|---|---|
| 2113392 | 4/1990 | Japan . |
| 335380 | 2/1991 | Japan . |

*Primary Examiner*—Michael G. Lee
*Attorney, Agent, or Firm*—Michael Chan

[57] ABSTRACT

The present invention relates to an apparatus (10) for issuing integrated circuit cards (9). The apparatus includes an integrated circuit card writer (12) arranged to issue each of the integrated circuit cards (9), with information stored therein. The apparatus (10) also includes a magnetic stripe card reader (16) which is arranged to read information from a magnetic stripe card (2) inserted therein and to transmit the information to the writer (12) to be written into a blank integrated circuit card (9) stored in the writer (12). A key pad is provided (22) for entering identifying information in respect of the user of the magnetic stripe card (2) is also provided.

6 Claims, 5 Drawing Sheets

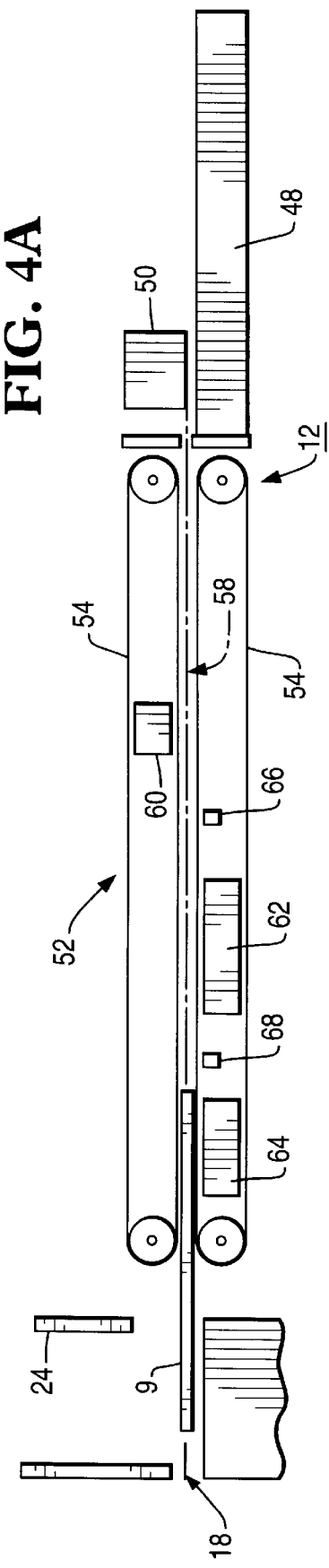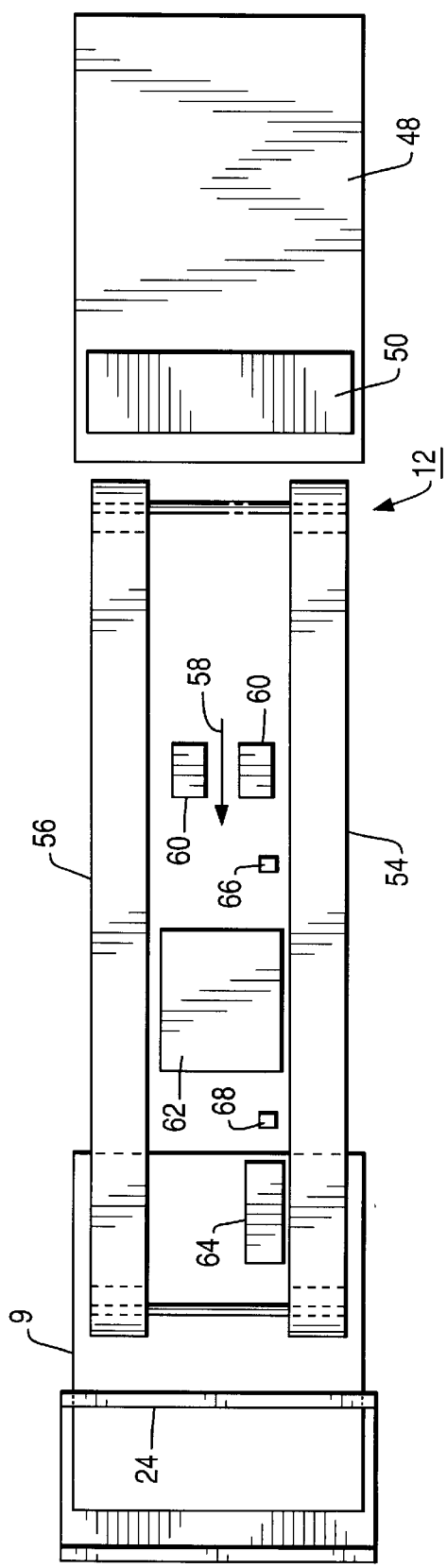

APPARATUS FOR ISSUING INTEGRATED CIRCUIT CARDS

BACKGROUND OF THE INVENTION

The present invention relates to an apparatus for issuing data cards and in particular to an apparatus for issuing integrated circuit cards.

There are presently two types of data card that can be used in transaction terminals such as Automated Teller Machines (ATMs): a magnetic stripe card; and an integrated circuit (IC) card. IC cards, commonly referred to as "smart cards", carry an IC chip which can be configured to provide a variety of functions, as is well known to persons skilled in the art.

Both types of card can store a variety of encoded user information, such as account information, or user identification information in the form of a so called PIN (Personal Identification Number) which is required by an ATM before the ATM will grant a user access to the services provided by the ATM.

However, a smart card can store considerably more information than a magnetic stripe card. For example, a smart card can be loaded, repeatedly and easily, with electronic data representative of a sum of money, the corresponding sum of money being debited from the user's bank account. The user is then able to use the smart card instead of cash in shops and other business outlets provided with a smart card reader/writer, the data in the card being adjusted to reflect each transaction. As the number of business outlets providing this so-called electronic cash service increases and the number of other functions provided by smart cards increases, more magnetic stripe card users will wish to be issued with a smart card. This demand for smart cards is likely to put an increasing administrative burden on the financial institutions that issued the magnetic stripe cards and which will be required to issue the replacement smart cards.

SUMMARY OF THE INVENTION

It is an object of the present invention to provide an apparatus which will reduce the burden to the financial institutions involved in issuing smart cards to replace magnetic stripe cards.

According to the present invention there is provided an apparatus for issuing integrated circuit cards, said apparatus including: an integrated circuit card writer arranged to issue each of said integrated circuit cards with information stored therein; a magnetic stripe card reader which is arranged to read information from a magnetic stripe card inserted therein and to transmit said information to said writer to be written into one of said integrated circuit cards; and means for entering identifying information in respect of the user of said magnetic stripe card.

It is an advantage of the present invention that authorized members of the public can use the apparatus to issue an integrated circuit card to replace their magnetic stripe card themselves, without the assistance of an employee of the financial institution which issued the magnetic stripe card.

BRIEF DESCRIPTION OF THE DRAWINGS

An embodiment of the present invention will now be described, by way of an example, with reference to the accompanying drawings, in which:

FIG. 4A is a schematic side view of a smart card writer in accordance with the invention, with a card being issued therefrom;

FIG. 4B is a schematic plan view of the card reader of FIG. 4A; and

FIG. 1A illustrates a magnetic stripe card 2 carrying a magnetic stripe 3 running along the length of the card 2 adjacent the reference edge 4 of the card 2. Substantially parallel to the magnetic stripe 3 is a stripe 5 designed to receive the written signature of the authorized user of the card.

DETAILED DESCRIPTION

Figure 1A:
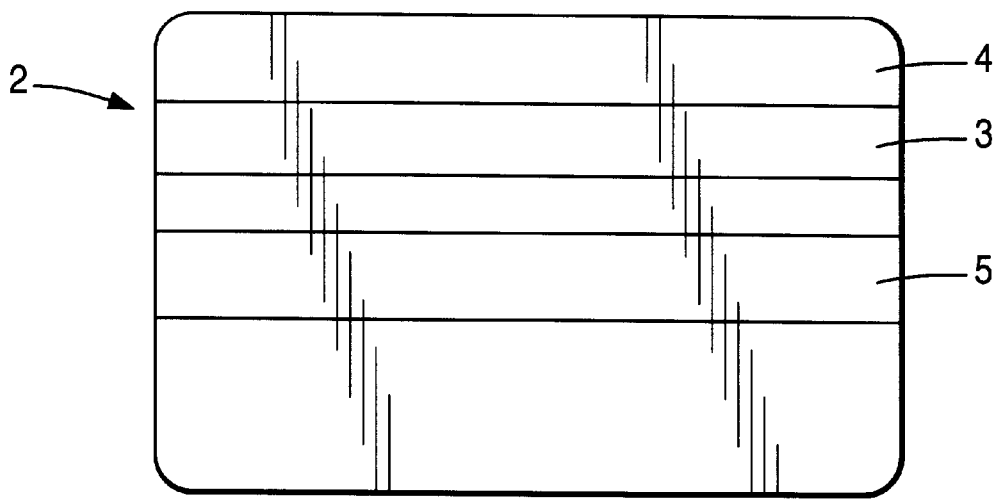
FIG. 1A is a schematic plan view of a magnetic stripe card.
Figure 1B:
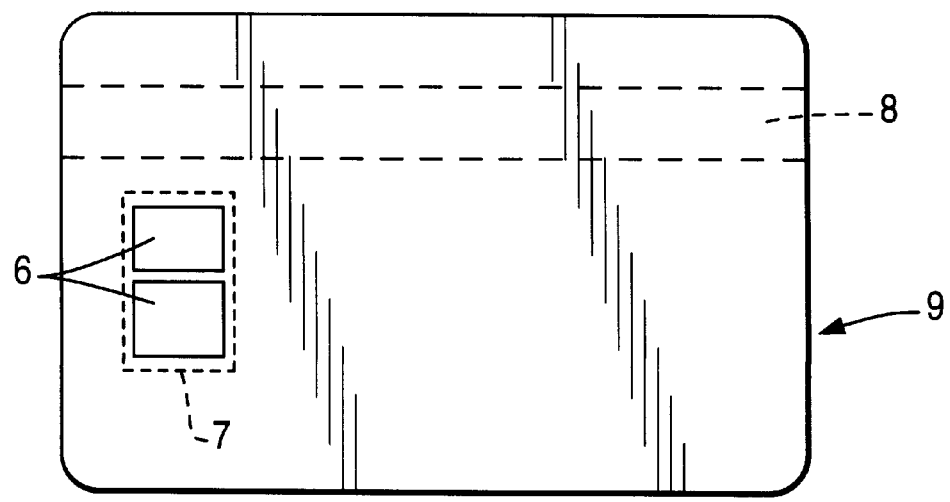
FIG. 1B is a schematic plan view of a contact smart card.

FIG. 1B illustrates a smart card 9 having two contact terminals 6 positioned on one side of the card 9, as will be known to a person skilled in the art. The smart card 9 also includes a microprocessor chip 7 embedded in the card 9 beneath the terminals 6, and a magnetic stripe 8 as in the magnetic stripe card 2, illustrated in FIG. 1A, on the opposite side from the terminals 6. The magnetic stripe 8 need not contain any data and is only required to gain access to a card reader, when in use.

Most cards are substantially rectangular in shape being approximately 85 mm long and 55 mm wide.

Figure 2:
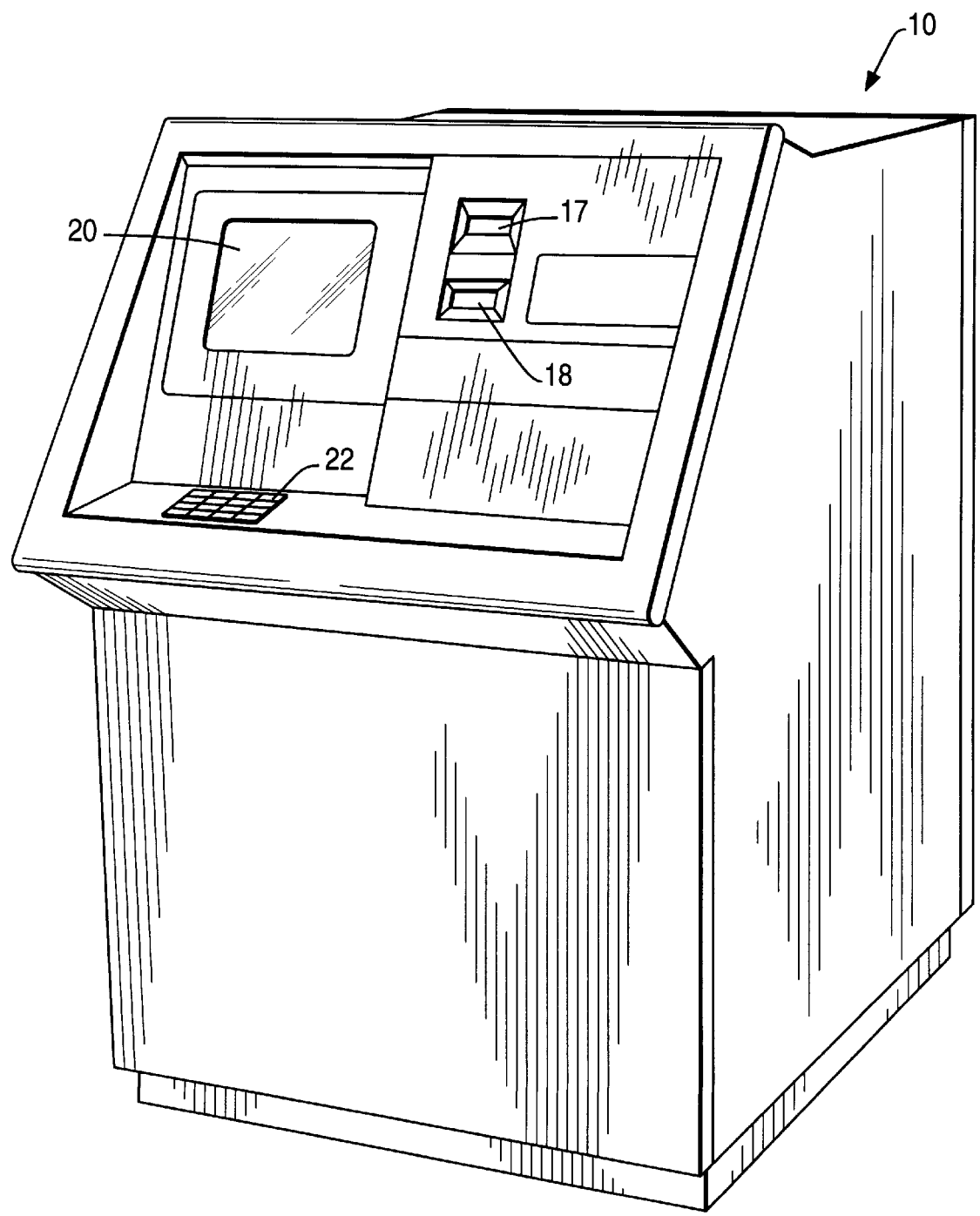
FIG. 2 is a perspective view of an apparatus in accordance with the present invention.
Figure 5:
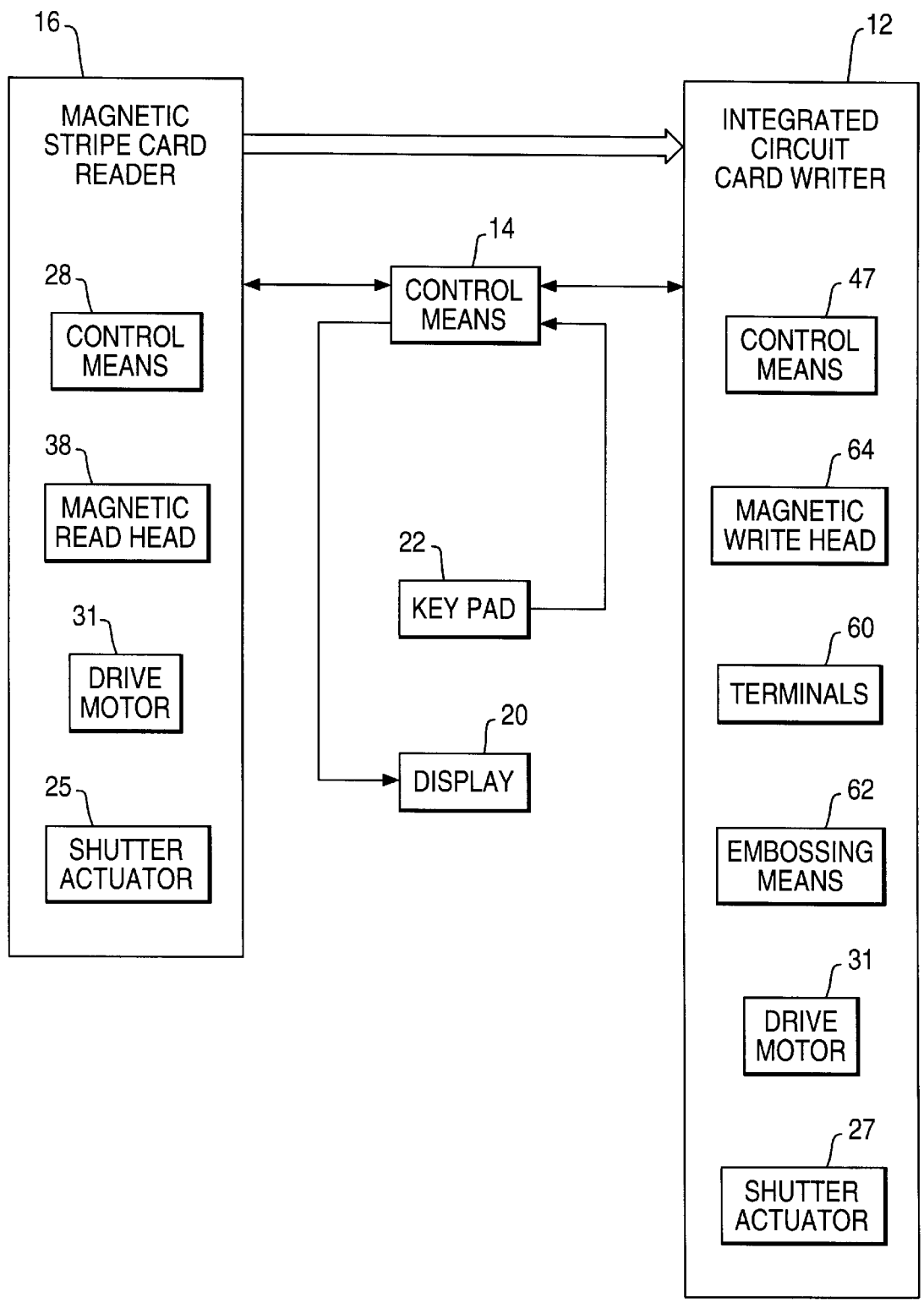
FIG. 5 is a block diagram of parts of the apparatus of FIG. 2.

FIGS. 2 and 5 illustrates an apparatus 10 for issuing smart cards 9, in accordance with the present invention, including a smart card writer 12 (FIGS. 4A and 4B) arranged to receive data, and to issue a smart card 9 programmed with said data. The apparatus 10 also includes a control means 14 and a magnetic stripe card reader 16 (FIGS. 3A and 3B) which is accessible for use by members of the public, and which is connected to the smart card writer 12 to provide the aforementioned information, from magnetic stripe cards 2 read by the reader 16.

The apparatus 10 further comprises a magnetic stripe entry slot 17 through which a magnetic stripe card 2 is inserted into the reader 16, to be read, and a smart card output slot 18 through which a smart card 9 is issued. The apparatus 10 also includes a user interface comprising a display screen 20 and a user input means in the form of a key pad 22.

Figure 3A:
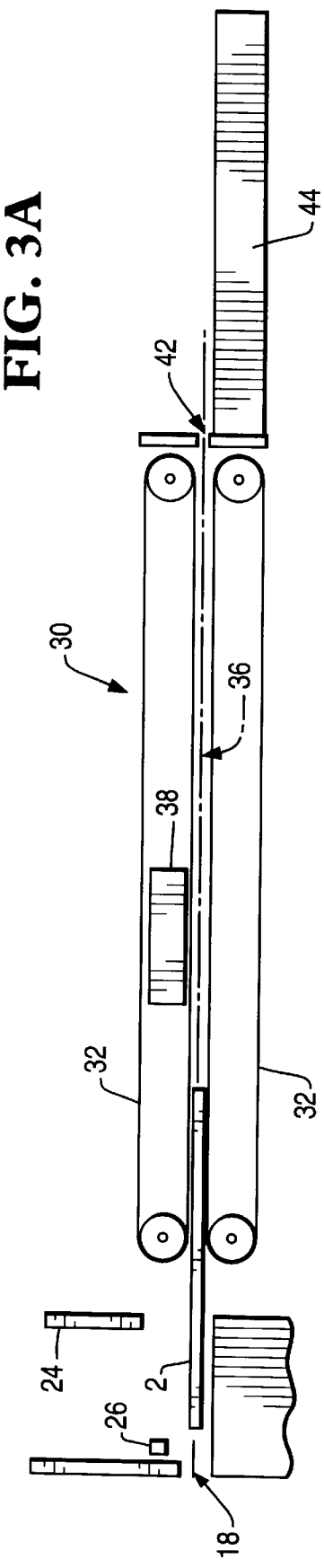
FIG. 3A is a schematic side view of a magnetic stripe card reader in accordance with the present invention, with a card inserted therein.
Figure 3B:
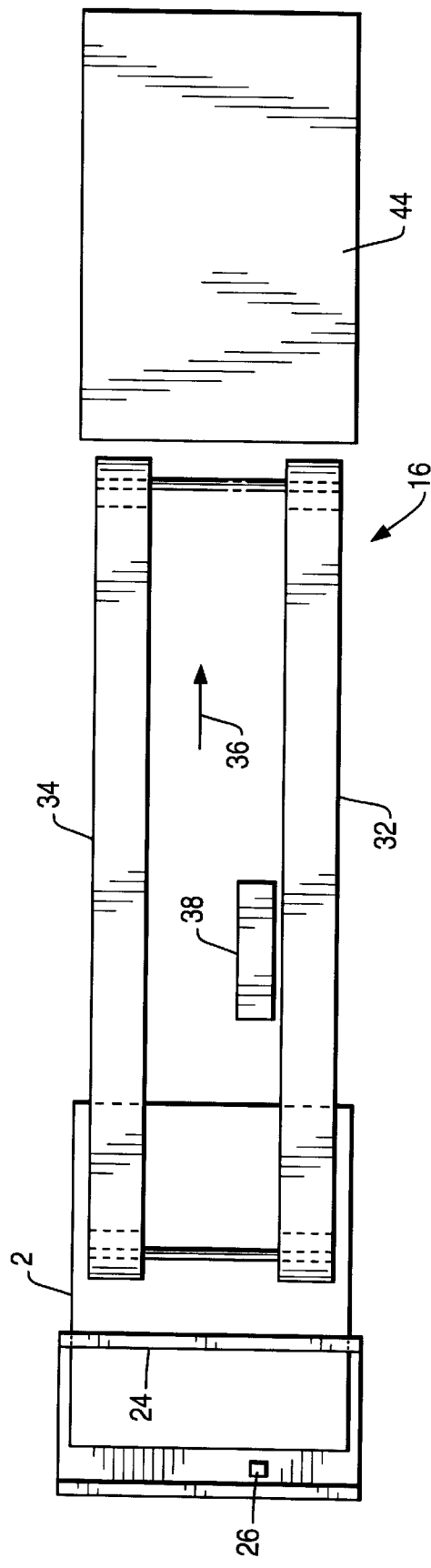
FIG. 3B is a schematic plan view of the card reader of FIG. 3A.

The magnetic stripe card reader 16, as illustrated schematically in FIGS. 3A and 3B, is a known magnetic stripe card reader.

When not in use, access to the interior of the reader 16 is prohibited by means of a retractable shutter 24, the shutter 24 being retractable, when actuated by a shutter actuator 25 (FIG. 5) under the control of the control means 28, so as to enable the card 2 to be received into the interior of the reader 16 (FIG. 3A).

The shutter 24 is located approximately 2 cms behind the slot 17. In the space between the slot 17 and the shutter 24 is located a pre-magnetic head 26, which detects whether or not a card 2 inserted into the slot 17 has a magnetic stripe 3, and sends a signal to that effect to a control means 28 in the reader 16.

The reader 16 incorporates card feed means 30 in the form of a first pair 32 and a second pair 34 of co-operating belt means which receive the card 2 adjacent the shutter 24 and convey the card 2 along a feed path 36.

A magnetic stripe read-head 38 is located in the reader 16 so that the magnetic stripe 3 of a card 2 when transported along the feed path 36 passes below the read head 38, which can read the data stored therein. The read-head 38 detects the changes in magnetism along the length of the stripe 3 and provides an electrical signal in response thereto to the control means 28, the signal being representative of the data stored in the stripe 3, as is well known to persons skilled in the art.

At the far end of the feed path 36, there is provided a second slot 42, which provides access to a retention bin 44, in which cards retained by the reader 16 are stored. Retention of a card is carried out in response to a signal from the control means 28, which is also operable to control all aspects of the operation of the reader 16, under instructions from the control means 14.

When the data has been read from the magnetic stripe 3, the reader 16 will retain the card 2 in the aforementioned retention bin 44, by actuating the drive motor 31 to drive the belt means 32 and 34 so as to feed the card 2 in the opposite direction to that required to feed the card towards the input slot 17.

FIGS. 4A and 4B illustrate a smart card writer 12 which is operable under the control of a control means 47, as instructed by the control means 14. The writer 12 incorporates a storage bin 48 for storing blank smart cards 9. Pick means 50 are provided above the storage bin 48 to pick the top smart card from the bin 48, from where it is received by transport means 52 in the form of a first pair 54 and a second pair 56 of belt means. The belt means 54 and 56 are arranged to form a feed path 58 through the card writer 12. The writer 12 is further provided with a pair of contact smart card terminals 60, which are mounted so as to be movable into engagement with the terminals 6 on the smart card 9, as will be known to a person skilled in the art.

Remote from the contact terminals 60 adjacent the feed path 58 is a known means 62 for embossing information onto the front face of the smart card 9, such as, for example, the authorized user's name and bank account details.

Adjacent the card embossing means 62 is a magnetic write head 64 adapted to write the data received from the magnetic stripe 3 in the magnetic stripe card 2 into the corresponding magnetic stripe 8 in the smart card 9.

Adjacent the end of the feed path opposite to the storage bin 48 is the output slot 18, through which the smart card 9 is presented for collection by the authorized user. The output slot 18 is also protected by a shutter 24 which is movable when actuated by a shutter actuator 27 to allow the belt means 54 and 56 to feed the card 9 out of the slot 18 for collection by the user.

When a user wishes to replace his magnetic stripe card 2 with a smart card 9, he inserts the magnetic stripe card 2 into the input slot 17 in the apparatus 10 and the magnetic stripe card 2 is taken into the magnetic stripe card reader 16. The user then enters his PIN using the key pad 22. The card 2 is transported under the magnetic read head 18 and the data stored in the magnetic stripe 3 is read. The data is then transmitted to the control means 14 in the apparatus 10. In known manner the control means 14 compares the PIN entered by the user with the encoded version of the PIN read from the magnetic stripe 3 in order to make a determination as to whether the user is the authorized user of the card 2.

The control means 14 also checks with a data base stored in a remote host computer (not shown) to ascertain whether the card 2 has expired or has been reported as stolen. If the PIN is incorrectly entered the apparatus 10 will not proceed with the issuance of a smart card, but instead will either instruct the user via the display screen 20 to re-enter the PIN or return the card 2 to the user or, as is the case when the card 2 is found to be invalid, the apparatus 10 will retain the card 2 in the bin 44.

If the entered PIN is correct and the card 2 is found to be valid, the control means 14 then instructs the pick means 50 to pick the top blank smart card 9 from the storage bin 48. The belt means 54 and 56 receive the card 9 from the pick means 50 and transport the card 9 to a location in which the terminals 6 on the card 9 are located below the contact terminals 60, as detected by an optical location sensor 66. The optical location sensor 66 detects the presence of the leading edge of the card 9, in a known manner. The terminals 60 are then moved into contact with the terminals 6 on the card 9 and the control means 14 transmits data to the chip 7 in the card 9 via the terminals 6, 60, including encoded details of a user's bank account and the personal identification number (PIN) associated with the magnetic stripe card (2).

Once this data is stored in the chip 7 the smart card 9 can be transported along the feed path 58 to the output slot 18 for collection by the authorized user of the card 9.

However, the user may request through the key pad 22 (FIG. 2) that the front face of the card 9 be embossed with particular details regarding the card 9, as discussed above. In this case the card 9 is transported along the feed path 58 only as far as the card embossing means 62, which is detected by a second optical location sensor 68.

If the user wishes the card 9 to function both as a smart card and as a magnetic stripe card then as the card 9 is transported under the magnetic write head 64 the write head 64 is actuated to write the aforementioned information from the magnetic stripe 3 in the magnetic stripe card 2 into the magnetic stripe 8 in the smart card 9.

Other functions may be included in further embodiments of the present invention including: means for loading the smart card 9 with data corresponding to money from the user's account. Also biometric security data such as a representation of an image of the authorized user or of his finger or hand print may be stored electronically, in a known manner, in the chip 7 in the smart card 9.

Also, if the user prefers he can have his magnetic stripe card 2 returned to him by the card reader 12 instead of or in addition to having the details therefrom written into the magnetic stripe in the smart card 9.

What is claimed is:

1. A self-service terminal for allowing a user to replace a magnetic stripe card with an integrated circuit card, the self-service terminal comprising:

a retention bin for storing magnetic stripe cards which have been replaced with integrated circuit cards;

a magnetic stripe card reader for (i) receiving a magnetic stripe card to be replaced from a user, and (ii) reading data from a magnetic stripe of the magnetic stripe card;

input means for enabling a user to enter user identifying information to allow the user to gain access to services provided by the self-service terminal when the magnetic stripe card reader receives a magnetic stripe card to be replaced from the user;

a storage bin for storing blank integrated circuit cards;

an integrated circuit card writer for (i) receiving a blank integrated circuit card from the storage bin, and (ii) transferring data read from a magnetic stripe of a magnetic stripe card to be replaced to the blank integrated circuit card to produce a loaded integrated circuit card to be delivered to a user; and control means for (i) controlling the magnetic stripe card reader to read data from a magnetic stripe of a magnetic stripe card to be replaced when the magnetic stripe card reader receives the magnetic stripe card from a user, (ii) controlling the magnetic stripe card reader and the integrated circuit card writer to transfer data which has been read from the magnetic stripe of the magnetic stripe card to a blank integrated circuit card when the integrated circuit card writer receives the blank integrated circuit card from the storage bin to produce a loaded integrated circuit card to be delivered to the user, (iii) controlling the integrated circuit card writer to deliver the loaded integrated circuit card to the user, and (iv) controlling the magnetic stripe card reader to move the magnetic stripe card into the retention bin to retain the magnetic stripe card when the loaded integrated circuit card is delivered to the user.

2. An apparatus according to claim 1, wherein the integrated circuit card writer includes means for embossing a front face of an integrated circuit card received from the storage bin with information based upon data which has been read from a magnetic stripe of a magnetic stripe card to be replaced.

3. An apparatus according to claim 1, wherein the integrated circuit card writer includes a magnetic write head for writing data which has been read from a magnetic stripe of a magnetic stripe card to be replaced to a magnetic stripe of an integrated circuit card received from the storage bin to enable the integrated circuit card to be used in either an integrated circuit card reader or a magnetic stripe card reader.

4. A method of replacing a magnetic stripe card with an integrated circuit card at a self-service terminal, the method comprising the steps of:

(a) receiving a magnetic stripe card from a user desiring to replace the magnetic stripe card with an integrated circuit card;

(b) reading data from a magnetic stripe of the magnetic stripe card received from the user in step (a);

(c) transferring data read in step (b) to a blank integrated circuit card to produce a loaded integrated circuit card to be delivered to the user;

(d) delivering the loaded integrated circuit card produced in step (c) to the user; and (e) moving the magnetic stripe card to a retention bin to retain the magnetic stripe card when the loaded integrated circuit card is delivered to the user.

5. A method according to claim 4, further comprising the step of:

(f) embossing a front face of an integrated circuit card received from the storage bin with information based upon data read from the magnetic stripe of the magnetic stripe card in step (b).

6. A method according to claim 4, further comprising the step of:

(f) transferring data read in step (b) to a magnetic stripe of the loaded integrated circuit card to enable the loaded integrated circuit card to be used in either an integrated circuit card reader or a magnetic stripe card reader.

* * * * *